US007011015B1

(12) United States Patent
Marghella

(10) Patent No.: US 7,011,015 B1
(45) Date of Patent: Mar. 14, 2006

(54) PANCAKE MOLD

(75) Inventor: Nicole M. Marghella, 2105 Unit B, Oxford Sq., Andrews AFB, MD (US) 20762

(73) Assignee: Nicole M. Marghella, Grand Blanc, MI (US)

( * ) Notice: Subject to any disclaimer, the term of this patent is extended or adjusted under 35 U.S.C. 154(b) by 373 days.

(21) Appl. No.: 10/341,674

(22) Filed: Jan. 14, 2003

Related U.S. Application Data

(60) Provisional application No. 60/348,838, filed on Jan. 14, 2002.

(51) Int. Cl.
  *A47J 43/28* (2006.01)
  *A47J 43/18* (2006.01)
  *A23P 1/00* (2006.01)

(52) U.S. Cl. ................. 99/427; 294/7; 294/8; 426/515; 426/505

(58) Field of Classification Search ................ 99/426, 99/427; 264/49, 53.5, 7, 8, 118; 426/496, 426/505, 515
See application file for complete search history.

(56) References Cited

U.S. PATENT DOCUMENTS

| | | | | |
|---|---|---|---|---|
| 2,182,726 | A | * | 12/1939 | King et al. .................. 30/114 |
| 2,916,320 | A | * | 12/1959 | Adams ...................... 294/26.5 |
| 5,131,320 | A | | 7/1992 | Jensen et al. |
| D329,003 | S | | 9/1992 | Jones |
| D333,761 | S | | 3/1993 | Dicochea |
| 5,230,156 | A | * | 7/1993 | Patenaude .................... 30/325 |
| D420,553 | S | * | 2/2000 | Bell ............................ D7/672 |
| 6,240,836 | B1 | | 6/2001 | Garbo |
| 6,539,844 | B1 | | 4/2003 | Bart |

* cited by examiner

Primary Examiner—Reginald L. Alexander
(74) Attorney, Agent, or Firm—Reising, Ethington, Barnes, Kisselle & Learman, P.C.

(57) ABSTRACT

The pancake mold includes a scissor assembly with a first arm connected to a second arm by a pivot pin. Both arms have a handle end and a tool end. A mold cavity former is attached to the tool end of the first arm. A spatula is attached to the tool end of the second arm. Moving the handle on the second arm toward the handle on the first arm moves the spatula under the mold cavity former and a partially cooked pancake in the mold cavity former. The scissor assembly is inverted to discharge a partially cooked pancake from the cavity and onto a grill for continued cooking.

7 Claims, 2 Drawing Sheets

PANCAKE MOLD

The disclosure incorporates a pancake mold disclosed in provisional patent application 60/348,838, filed Jan. 14, 2002, whose priority is claimed for this application.

TECHNICAL FIELD

The pancake mold is a kitchen utensil having a continuous wall that sits on a hot griddle or pan surface, receives pancake batter and controls the shape and size of pancakes.

BACKGROUND OF THE INVENTION

Batter cakes are thin cakes made from a batter of flour, milk, water, eggs and other ingredients and cooked on a plate over a heat source. The flour can be made from a number of different grains. Fruits, sourdough and other ingredients are frequently added to the batter. The cakes are cooked on both sides until they are browned.

The periphery of the cakes are irregular in shape, relatively thin and generally have a darker brown than the center portion of the cakes. Their centers may not be sufficiently cooked when the outer surfaces are too brown. The size of the cakes also varies substantially and is difficult to control.

Batter is cooked in waffle irons to obtain a more uniform cake. These cakes tend to be crisp, uniformly cooked from one edge to the other, and uniform in size and shape. To prevent the batter from sticking to the plates, it is often necessary to add some oil to the batter. Some individuals do not like the crispness of waffles. Other individuals do not like the added oil which can be relatively difficult to digest.

Children frequently reject flat pancakes because their peripheries are overcooked and their centers are undercooked. They also tend to find their generally round shape uninteresting and unappetizing.

SUMMARY OF THE INVENTION

The pancake mold includes a scissor assembly with a first arm having a first handle end and a first tool end and a second arm pivotally attached to the first arm by a pivot pin and having a second handle end and a second tool end. A mold cavity former including a continuous wall with a top surface and a bottom surfaces is attached to the first tool end of the first arm. A spatula is attached to the second tool end of the second arm. Moving the second handle end of the second arm toward the first handle end of the first arm pivots the second arm relative to the first arm and moves the spatula to a position adjacent to the bottom surface of the mold cavity former. The spatula substantially covers the bottom of the mold cavity former.

Turning the mold cavity former and the spatula upside down dumps a partially cooked pancake onto a cooking surface. The uncooked side of the pancake is then cooked. The resulting pancake has a relatively uniform thickness. The outer edges are not thin and overcooked. The unique shapes of the pancakes are of interest to children and encourages them to eat more.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
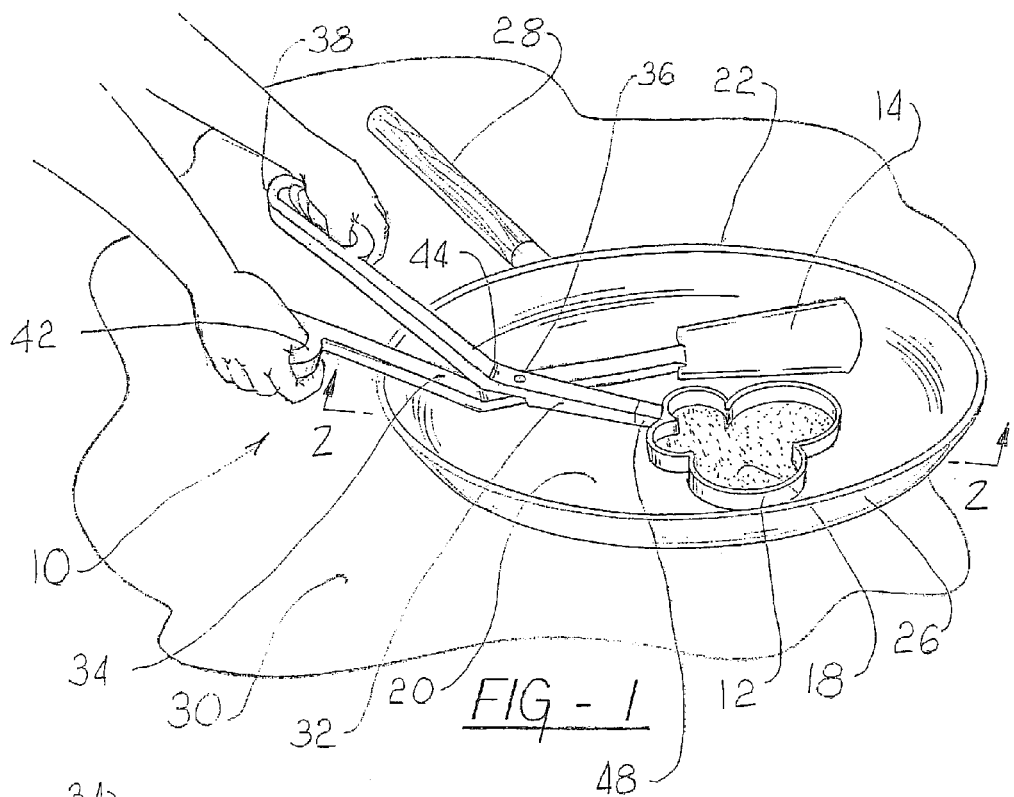
FIG. 1 is a perspective view of the pancake mold in a frying pan.

The pancake mold 10 as shown in FIG. 1 has a mold cavity former 12, and a spatula 14 connected to a scissor linkage 16. The mold cavity 12 contains pancake batter 18 on the surface 20 of a frying pan 22. The frying pan 22 has a bottom plate 24 with a cooking surface 20, a continuous outer wall 26 and a handle 28. The frying pan 22 is supported by the cooking surface 30 of a stove.

The scissor linkage 16 includes arms 32 and 34 connected to each other by a pivot pin 36. The arm 32 has a left handle loop 38 integral with one end and the mold cavity former 12 attached to the other end by a threaded stud 40. The arm 34 has a right handle loop 42 integral with one end and the spatula 14 attached to the other end. Both arms 32 and 34 have bends 44 that permit the arms to extend up over the wall 26 of the frying pan 22 while keeping the mold cavity 12 flat on the surface 20 of the frying pan. The left and right handle loops 38 and 42 remain well above the cooking surface 30 of the stove so that they do not become too hot. As shown in FIG. 1, a child is grasping one of the handle loops 38 or 42 with each hand. An adult would likely manipulate both handle loops with one hand.

The spatula 14 is a thin, somewhat flexible stainless steel plate member that scrapes a pancake from a cooking surface 20 when the batter is cooked on one side. The spatula 14 could also be made from some plastic materials that maintain their shape at cooking temperatures and resist sticking to the pancake batter 18. The spatula 14 can also be a steel plate with a coating that resists sticking.

The mold cavity former 12, as shown, is a continuous wall 46 in the shape of a cloud or butterfly. The wall 46 has a vertical height that exceeds the thickness of pancakes. A boss 48 on the wall 46 has a threaded bore that receives the threaded stud 40 to connect the mold cavity 12 to the arm 32 of the scissor linkage 16. This connection between the arm 32 and the mold cavity 12 permits the use of mold cavities with different shapes. A connector without threads could be employed in place of the threaded stud 40 and the threaded bore in the boss 48. The cavity former 12 that is shaped like a cloud can be replaced by mold cavity with the shape of a fish, a cow, a person, a car or any other desired shape. The size of the mold cavity can be selected.

Figure 2:
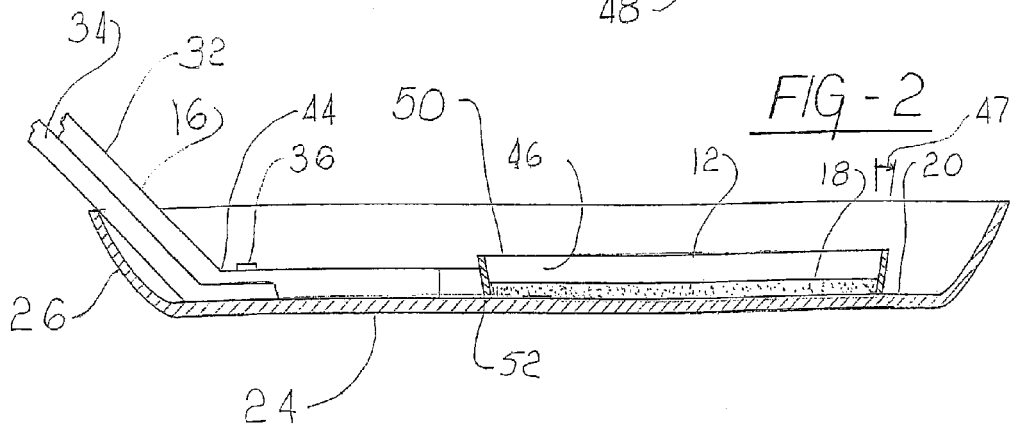
FIG. 2 is a sectional view taken along line 2—2 in FIG. 1.

The mold cavity former 12 can be made from a variety of materials. Cast iron and copper alloys would both work well. These materials have a relatively high rate of heat transfer and would absorb heat from the bottom plate 24 of the pan 22. The wall 46 should absorb sufficient heat from the pan 22 to ensure that the edges of the pancake batter are cooked sufficiently. The wall 46 of the mold 12 has some draft defined by the draft angle 47 as shown in FIG. 2 making the opening defined by the top surface 50 somewhat larger than the opening defined by the bottom surface 52. This draft lets a pancake fall from the mold cavity 12 when the mold is turned upside down.

Figure 3:
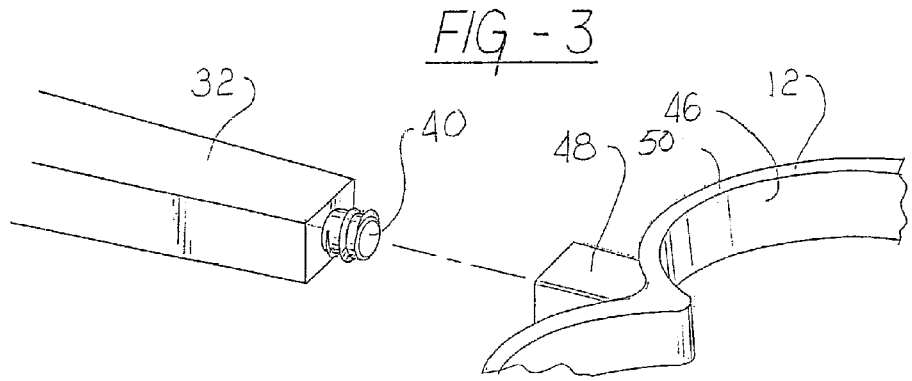
FIG. 3 is an expanded view with parts broken away.
Figure 4:
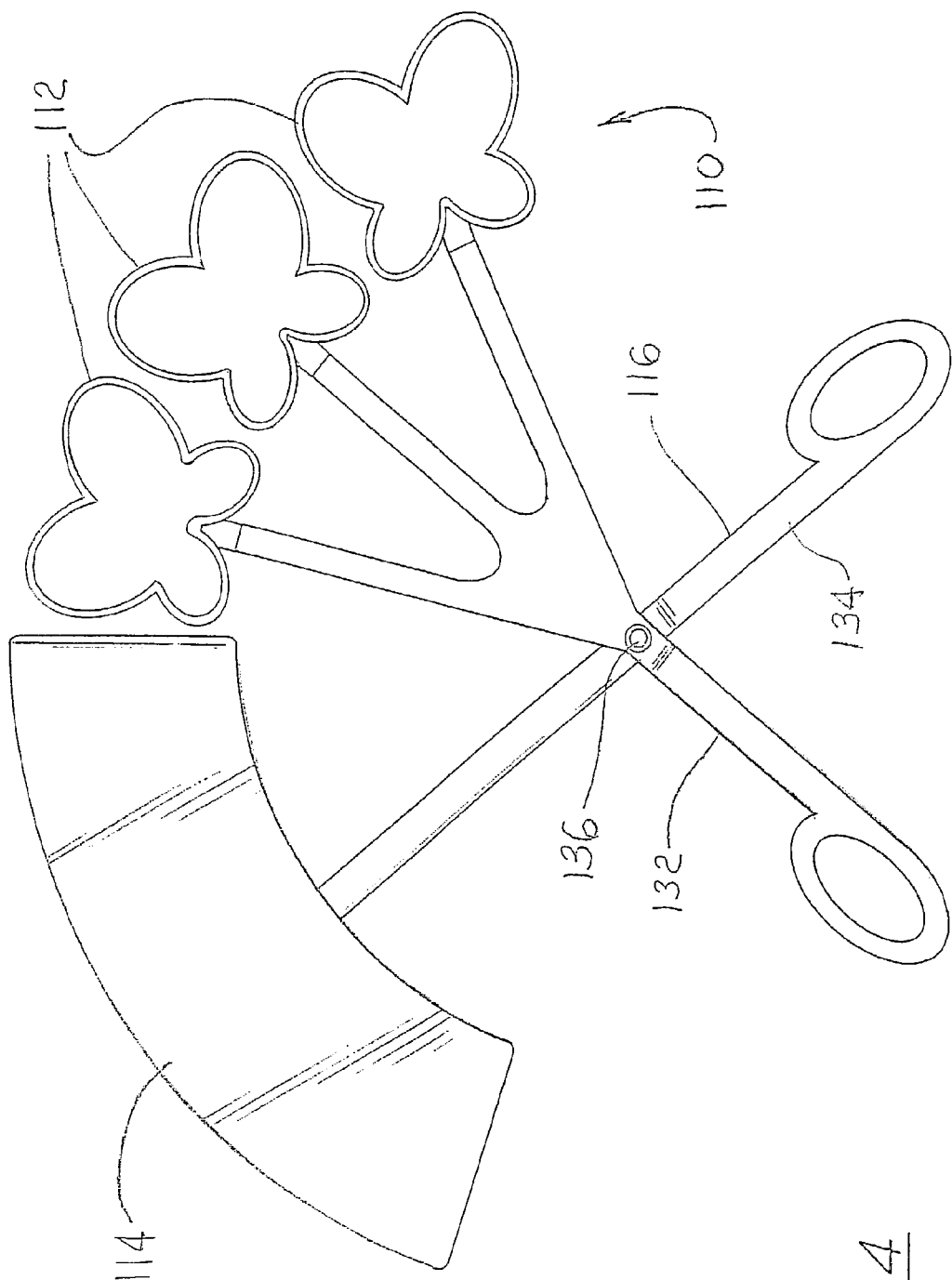
FIG. 4 is a plan view of a pancake mold with multiple mold cavities.

FIG. 4 discloses a large pancake mold 110 with three mold cavities 112 rather than one cavity. There could be two mold cavities 112 or more than three cavities if desired. The mold cavities 112 can be identical to the cavity 12 shown in FIGS. 1, 2 and 3. The spatula 114 is enlarged to simultaneously slide under and close the bottom of all three mold cavities 112. The scissor linkage 116 is modified as required to accommodate a plurality of mold cavities 112 and a larger spatula 114. If the mold cavities 112 are small, the pancake mold 110 can be used with the frying pan 22 described above. If the mold cavities 112 are relatively large, the pancake mold 110 would be used on a large flat grill plate heated by multiple heating elements. The arms 132 and 134 are changed in size as required and a pivot pin 136 with adequate strength is employed.

During use of the pancake mold 10, the mold cavity 12 and the spatula 14 are placed on the surface 20 of a frying pan 22 or on a grill plate and heated to an adequate temperature. Normally some oil is placed on the surface 20. Pancake batter 18 is poured into the mold cavity 12. The batter 18 could include increased water or milk if desired since it will be contained by the continuous wall 46. The quantity of batter 18 is controlled to produce a pancake with a desired thickness. By using the mold cavity 12, it is possible to make relatively thin or thick pancakes.

Upon the pancake batter 12 being sufficiently cooked on its bottom and sides, the handle loop 42 is moved toward the handle loop 38 and the spatula 14 is moved under the bottom surface 52 of the mold cavity 12 and along the surface 20 of the bottom plate 24 and under the half cooked pancake batter 18. The pancake mold 10 is then turned upside down and the half cooked pancake batter 18 is dumped from the mold cavity 12 and onto the cooking surface 20 with its cooked side facing upward. The draft on the continuous wall 46 ensures that the edges of the partially cooked pancake batter 18 do not stick to the mold wall of the mold cavity 12.

The cooked pancake 18 is removed from the cooking surface 20 when it is completely cooked. The pancake mold 10 is then returned to the position shown in FIGS. 1 and 2 and pancake batter 18 is again poured into the mold cavity 12.

The pancake mold 110 shown in FIG. 4 is used as described above except that multiple mold cavities receive batter 18 rather than one cavity 12. All of the mold cavities 112 must receive batter 18 at about the same time and the cooking surface 20 under each mold cavity 112 has to be substantially the same temperature so that all of the pancakes 18 are ready to be turned over simultaneously.

The disclosed embodiment is representative of a presently preferred form of the invention, but is intended to be illustrative rather than definitive thereof. The invention is defined in the claims.

I claim:

1. A pancake mold comprising:
   a scissor assembly with a first arm having a first handle end and a first tool end, and a second arm pivotally attached to the first arm by a pivot pin and having a second handle end and a second tool end;
   a mold cavity former including a continuous wall with a top surface, a bottom surface and a draft angle attached to said first tool end on the first arm;
   a top mold opening defined by the top surface that is larger than a bottom mold opening defined by the bottom surface;
   a spatula attached to the second tool end of the second arm; and
   wherein moving the second handle end of the second arm toward the first handle end of the first arm pivots the second arm relative to the first arm and moves the spatula to a position adjacent to the bottom surface of the mold cavity former and substantially covers the bottom of the mold cavity former.

2. A pancake mold as set forth in claim 1 wherein the mold cavity former is made from a copper alloy.

3. A pancake mold comprising:
   a scissor assembly with a first arm having a first handle end and a first tool end, and a second arm pivotally attached to the first arm by a pivot pin and having a second handle end and a second tool end;
   a mold cavity former including a continuous wall with a top surface, and a bottom surface attached to said first tool end on the first arm;
   wherein the first arm and the second arm both have a bend that positions the first handle end and the second handle end on an opposite side of the top surface from the bottom surface of the mold cavity former;
   a spatula attached to the second tool end of the second arm; and
   wherein moving the second handle end of the second arm toward the first handle end of the first arm pivots the second arm relative to the first arm and moves the spatula to a position adjacent to the bottom surface of the mold cavity former and substantially covers the bottom of the mold cavity former.

4. A pancake mold comprising:
   a scissor assembly with a first arm having a first handle end and a first tool end, and a second arm pivotally attached to the first arm by a pivot pin and having a second handle end and a second tool end;
   a mold cavity former including a continuous wall with a top surface and a bottom surface attached to said first tool end on the first arm;
   wherein the mold cavity former is removably attached to said first tool end of the first arm;
   a spatula attached to the second tool end of the second arm; and
   wherein moving the second handle end of the second arm toward the first handle end of the first arm pivots the second arm relative to the first arm and moves the spatula to a position adjacent to the bottom surface of the mold cavity former and substantially covers the bottom of the mold cavity former.

5. A pancake mold comprising:
   a scissor assembly with a first arm having a first handle end and a first tool end, and a second arm pivotally attached to the first arm by a pivot pin and having a second handle end and a second tool end;
   a mold cavity former including a continuous wall with a top surface, a bottom surface, and a draft angle that results in a top mold opening, defined by the top surface, being larger than a bottom mold opening defined by the bottom surface;
   wherein said mold cavity is releasably attached to the first tool end of the first arm;
   a spatula attached to the second tool end of the second arm; and
   wherein the first arm and the second arm both have a bend that positions the first handle end and the second handle end on an opposite side of a top plane including the top surface from a bottom plane including the bottom surface and wherein moving the second handle end of the second arm toward the first handle end of the first arm pivots the second arm relative to the first arm and moves the spatula to a position adjacent to the bottom surface of the mold cavity former and substantially covers the bottom mold opening.

6. A pancake mold as set forth in claim 5 wherein the first arm has a plurality of first tool ends; a plurality of the mold cavity formers each or which is attached to the plurality of first tool ends; and wherein the spatula is movable with the second arm to a position in which the spatula simultaneously covers the bottom mold opening of each of the plurality of mold cavity formers.

7. A method of forming a pancake with a pancake mold comprising:
   positioning a mold cavity former of said pancake mold on a pancake cooking surface;
   heating the mold cavity former;
   pouring pancake batter into a cavity formed by the mold cavity former;
   cooking the pancake batter until a first pancake surface is browned;
   sliding a spatula between the pancake cooking surface and the mold cavity former and the pancake batter;
   turning the mold cavity former and the spatula upside down;
   discharging the partially cooked pancake batter from the mold cavity and onto the pancake cooking surface with the browned surface up;
   cooking the uncooked side of the pancake batter; and
   remove the cooked pancake from the pancake cooking surface.

\* \* \* \* \*